(12) United States Patent
Schmidt et al.

(10) Patent No.: US 11,399,244 B2
(45) Date of Patent: Jul. 26, 2022

(54) HEARING INSTRUMENT

(71) Applicant: Sivantos Pte. Ltd, Singapore (SG)

(72) Inventors: Martin Schmidt, Erlangen (DE); Peter Nikles, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 17/070,007

(22) Filed: Oct. 14, 2020

(65) Prior Publication Data

US 2021/0112348 A1   Apr. 15, 2021

(30) Foreign Application Priority Data

Oct. 15, 2019 (DE) .................... 102019215843.9

(51) Int. Cl.
*H04R 25/00* (2006.01)

(52) U.S. Cl.
CPC ....... *H04R 25/602* (2013.01); *H04R 2225/31* (2013.01)

(58) Field of Classification Search
CPC ............. A61N 1/375; H04R 2225/31; H04R 2225/55; H04R 25/602; H04R 1/1025; H04R 2225/33; H01F 27/24; H04B 5/0006; H04B 5/0087; H04B 5/0093
USPC ......................... 381/312, 323–324
See application file for complete search history.

(56) References Cited

U.S. PATENT DOCUMENTS

| 9,667,089 B2 | 5/2017 | Ema et al. |
| 10,020,673 B2 | 7/2018 | Yamaguchi et al. |
| 10,777,892 B2 | 9/2020 | Nikles et al. |
| 10,893,368 B2 | 1/2021 | Nikles |
| 2013/0178153 A1 | 7/2013 | Thoen |
| 2015/0214774 A1* | 7/2015 | Ema ............ H01M 10/46 320/108 |
| 2017/0127196 A1* | 5/2017 | Blum ............ H02J 50/12 |
| 2018/0286579 A1 | 10/2018 | Hanabusa et al. |

FOREIGN PATENT DOCUMENTS

| DE | 202018104183 U1 | 9/2019 |
| DE | 102018221568 A1 | 6/2020 |
| EP | 2453585 A1 | 5/2012 |
| EP | 2503796 B1 | 5/2014 |
| EP | 2899830 B1 | 8/2017 |
| WO | 2017153274 A1 | 9/2017 |

* cited by examiner

*Primary Examiner* — George C Monikang
(74) *Attorney, Agent, or Firm* — Laurence A. Greenberg; Werner H. Sterner; Ralph E. Locher

(57) ABSTRACT

A hearing instrument is specified having a rechargeable battery, a charging coil for inductively receiving energy for charging the battery, a transmitter and/or receiver coil electrically separated from the charging coil for inductively transmitting and/or receiving data, and a magnetic core. Both the charging coil and the transmitter and/or receiver coil are wound on the magnetic core.

10 Claims, 3 Drawing Sheets

HEARING INSTRUMENT

CROSS-REFERENCE TO RELATED APPLICATION

This application claims the priority, under 35 U.S.C. § 119, of German application DE 10 2019 215 843, filed Oct. 15, 2019; the prior application is herewith incorporated by reference in its entirety.

BACKGROUND OF THE INVENTION

Field of the Invention

The invention relates to a hearing instrument having a rechargeable battery, a charging coil and a transmitter and/or receiver coil.

Devices which are worn on or in the ear of a user (wearer) and emit an acoustic signal to the ear of the wearer are generally referred to as a "hearing instrument" hereinafter. In particular, hearing instruments include devices which pick up ambient sound, modify it for signaling and emit a modified sound signal to the ear of the wearer. A subcategory of hearing instruments of this type, which are classically referred to as "hearing aids", is set up for the care of people with a hearing impairment who, in medical terms, suffer from hearing loss. For this purpose, a hearing aid typically contains an input transducer, for example in the form of a microphone, a signal processing unit with an amplifier, as well as an output transducer. The output transducer is usually realized as an electroacoustic transducer, in particular as a miniature loudspeaker, and in this case is also referred to as a "receiver". Moreover, bone conduction hearing aids, implantable or vibrotactile hearing aids are also available on the market. In the case of these, the stimulation of the damaged hearing takes place in either a mechanical or electrical manner.

In addition to the classic hearing aids described previously, hearing instruments are provided for supporting the hearing of users with normal hearing. Hearing instruments of this type which are also referred to as "personal sound amplification products" or "personal sound amplification devices" (abbreviated: "PSAD") are designed in a similar manner to classic hearing aids in terms of structure and also have the components described above, i.e. an input transducer, a signal processing unit as well as an output transducer.

Furthermore, the invention also relates to hearing instruments which receive the acoustic signal from a peripheral device in a wired or wireless manner, for example headphones and headsets.

Different configurations of hearing instruments have been established in order to accommodate the variety of individual needs of different wearers. In the case of so called behind-the-ear (BTE) hearing instruments, a housing is worn behind the ear which contains the battery as well as further components where applicable, such as an input transducer, signal processing, etc. In this case, the output transducer can be arranged directly in the ear canal of the wearer (in so called ex-receiver or receiver-in-the-canal (RIC for short) hearing instruments). Alternatively, the output transducer is arranged inside the housing worn behind the ear. In this case, a flexible sound tube, also referred to as a "tube", guides the sound signal of the output transducer from the housing to the ear canal. In the case of so called in-the-ear (ITE) hearing instruments, a housing which contains all of the functional components of the hearing instrument is at least partially worn in the ear canal. So called completely-in-canal (CIC) hearing instruments are similar to the ITE hearing instruments, but they are worn completely in the ear canal.

Modern hearing instruments are characterized by an increasing number of integrated functions, such as active noise suppression, voice or speech recognition, etc., for example. Hearing instruments therefore have growing energy requirements which often cannot be met in a satisfactory manner by today's standard disposable batteries. Owing to growing energy requirements, but also in accordance with simple and resource-efficient operation, high performance, rechargeable batteries, in particular lithium-ion batteries (Li-ion batteries for short) are increasingly used as a power source for hearing instruments instead of disposable batteries. Wireless charging technologies are preferably used for charging batteries of this type. A charging coil is typically integrated in the hearing instrument for this purpose, which charging coil receives the energy which is required for charging the battery via an inductive coupling with a charging device.

Conversely, a transmitter and/or receiver coil (MI antenna) is often also integrated in a modern hearing instrument, by means of which coil the hearing instrument can exchange data with an external transmitter and/or receiver, for example in a second hearing instrument for the other ear of the wearer, via a magnetically inductive coupling.

The integration of this plurality of coils is already difficult merely because of the significantly limited installation space in a hearing instrument. To complicate matters, if the positioning of the plurality of coils in a hearing instrument is too tight or disadvantageous, a magnetic coupling between the coils can occur which occasionally considerably impairs the function of the coils.

A charging coil module with a charging coil which is wound around the circumference of a hollow, cylindrical magnetic core is known from European patent EP 2 899 830 B1 which corresponds to U.S. Pat. No. 9,667,089. A rechargeable battery is arranged in the interior of the magnetic core, which rechargeable battery is charged by means of the battery. The charging coil can also be used as an antenna coil.

A mobile device with a rechargeable battery, a charging coil and an near field communication (NFC) antenna is known from U.S. Pat. No. 10,020,673 B2. In this case, the charging coil and the NFC antenna are arranged in such a way that their coil axes are orthogonal to one another.

BRIEF SUMMARY OF THE INVENTION

The underlying object of the invention is to make it possible to arrange a transmitter and/or receiver coil (MI antenna) and a charging coil in a hearing instrument in a compact and particularly advantageous manner.

This object is solved according to the invention by the features of the independent claim. Advantageous embodiments of the invention are explained in the subordinate claims and the following description.

The invention is based on a hearing instrument which has a rechargeable battery, a charging coil for inductively receiving energy for charging the battery, as well as a transmitter and/or receiver coil (MI antenna) electrically separated from the charging coil for inductively transmitting and/or receiving data. According to the invention, the hearing instrument has a magnetic core, in particular made from soft magnetic ferrite material. According to the invention, both the charging coil and the transmitter and/or receiver coil are wound on this magnetic core.

The two coils can be designed in a particularly space-saving manner by using the same magnetic core.

The charging coil and the MI antenna are preferably wound on the magnetic core in such a way that their coil axes are oriented precisely or approximately orthogonally to one another. Owing to this arrangement of the two coils relative to one another, a mutual magnetic influence of the two coils is precluded or at least substantially reduced. However, according to experience, minor deviations from a precisely orthogonal orientation of the coil axes are uncritical for the intended effect of a magnetic decoupling of the coils. In addition, the winding of the magnetic core with the two coils is subject to certain manufacturing tolerances, in particular if the magnetic core is not cuboidal in shape. A precisely or approximately orthogonal orientation of the coil axes is therefore in particular already provided if the coil axes between them form an angle of 90°±30°, preferably 90°±15° and in particular 90°±5°.

In a particularly advantageous embodiment of the invention, the magnetic core is designed as a (pod-shaped, annular or, for example, horseshoe-shaped) hollow body in which the battery is received. Additionally or alternatively to the battery, an electronic component of the hearing instrument, in particular a charging electronics system, can be arranged in the hollow magnetic core within the context of the invention. The hollow design of the magnetic core and the accommodation of the battery or the electronic component in the magnetic core make a particularly compact design of the hearing instrument possible. At the same time, the magnetic core can be designed with a particularly large enclosed volume (in particular with a particularly large cross section) as a result, without it unduly impeding the arrangement of the other components in the housing. In turn, the large volume of the magnetic core enables high effectiveness of the MI antenna wound around the magnetic core.

In a functional design, the magnetic core has a cylindrical form with two parallel end faces, which are opposite one another along an axis, and a circumferential wall which connects the end faces. In this case, the end faces are preferably designed to be circular, but in principle within the context of the invention can also be oval, polygonal or irregularly shaped. In an advantageous dimensioning, the height of the magnetic core measured along the axis to the width of the magnetic core measured transverse to the axis is in a ratio between 1:1 and 1:4 (if the end faces are not circular in shape, the width is thus provided by the greatest expansion of the magnetic core transverse to the axis). In particular, the ratio of height to width of the magnetic core is approximately 1:2.5. In this case, the magnetic core therefore has the form of a flat cylinder.

In the case of a cylindrical magnetic core, one of the two coils, in particular the MI antenna, is preferably wound around the circumferential wall, so that its coil axis is oriented parallel to the axis of the magnetic core. In contrast, the other coil, in particular therefore the charging coil, is wound over the end faces and circumferential wall of the magnetic core, so that its coil axis is oriented orthogonally (perpendicular) to the axis of the magnetic core.

Within the context of the invention, the hearing instrument can be designed in any of the aforementioned embodiment variants, in particular as a hearing aid (designed for the care of users with a hearing impairment), as a personal sound amplification device, as headphones or a headset. Moreover, the hearing instrument according to the invention can be realized in any design, in particular one of the aforementioned designs (BTE, RIC, ITE, CIC, etc.).

Other features which are considered as characteristic for the invention are set forth in the appended claims.

Although the invention is illustrated and described herein as embodied in a hearing instrument, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Mutually corresponding parts are always provided with the same reference numbers in all of the figures.

Figure 1:
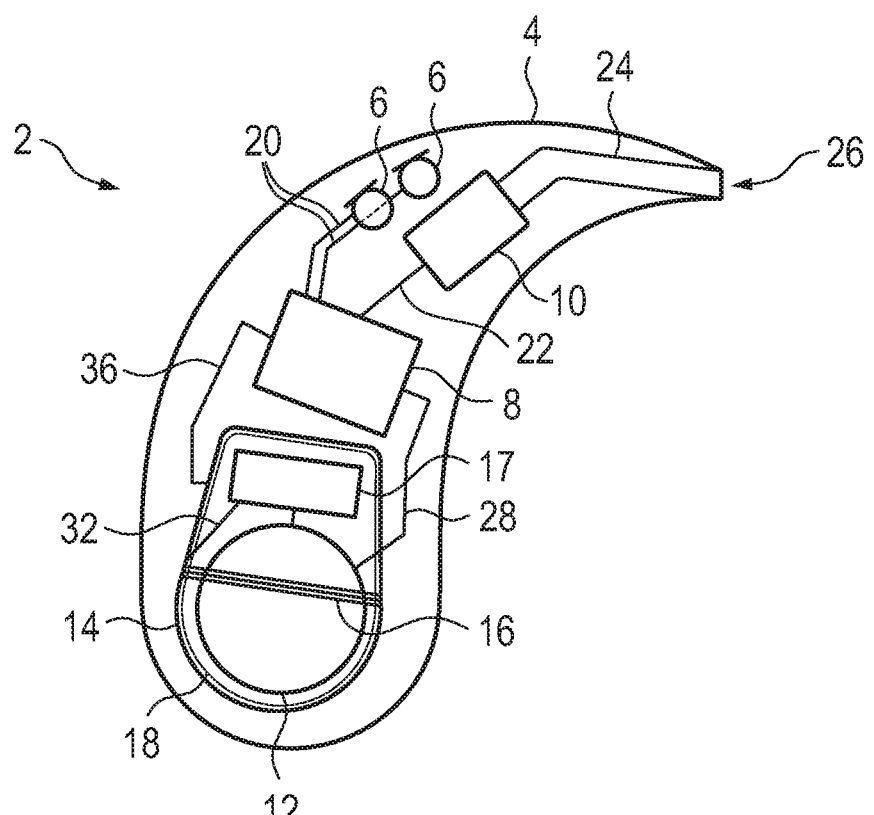
FIG. 1 is a schematic representation of a hearing instrument having a hollow magnetic core in which a rechargeable battery and a charging electronics system are arranged, as well as having two coils which are electrically separated from one another, namely a charging coil and a transmitter and receiver coil (MI antenna) which are both wound around the magnetic core.

Referring now to the figures of the drawings in detail and first, particularly to FIG. 1 thereof, there is shown a hearing instrument 2 in the form of a BTE hearing aid in a roughly schematic manner.

The hearing instrument 2 contains a housing 4 which is to be worn behind the ear of a hearing impaired wearer, in which housing two input transducers 6 in the form of microphones, a signal processing unit 8 with a digital signal processor (e.g. in the form of an ASIC) and/or a microcontroller, an output transducer 10 in the form of a receiver as well as a rechargeable battery 12 are arranged. The battery 12 is a Li-ion battery. The hearing instrument 2 further contains a (magnetic) inductive coil (hereinafter MI antenna 14) for transmitting and/or receiving magnetic alternating signals, a charging coil 16, a charging electronics system 17 as well as a magnetic core 18.

During operation of the hearing instrument 2, a sound signal is picked up from the environment of the hearing instrument 2 by means of the input transducer 6 and is output to the signal processing unit 8 via signal lines 20 as an audio signal (i.e. as an electrical signal carrying the sound information). The signal processing unit 8 processes the picked-up audio signal. The signal processing unit 8 contains in particular an amplifier for this purpose, by means of which the picked-up audio signal is amplified in a frequency-dependent manner in order to compensate for the hearing impairment of the wearer. The signal processing unit 8 outputs a modified audio signal resulting from this processing to the output transducer 10 via a signal line 22. This output transducer in turn converts the modified audio signal into a sound signal. This sound signal (which is modified compared to the sound picked up from the environment) is guided from the output transducer 10 firstly through a sound channel 24 to a tip 26 of the housing 4, and from there through a (not explicitly represented) sound tube to an earpiece which can be inserted or is inserted into the ear of the wearer.

The signal processing unit 8 is supplied with electrical energy from the battery 12 via a current line 28.

Figure 2:
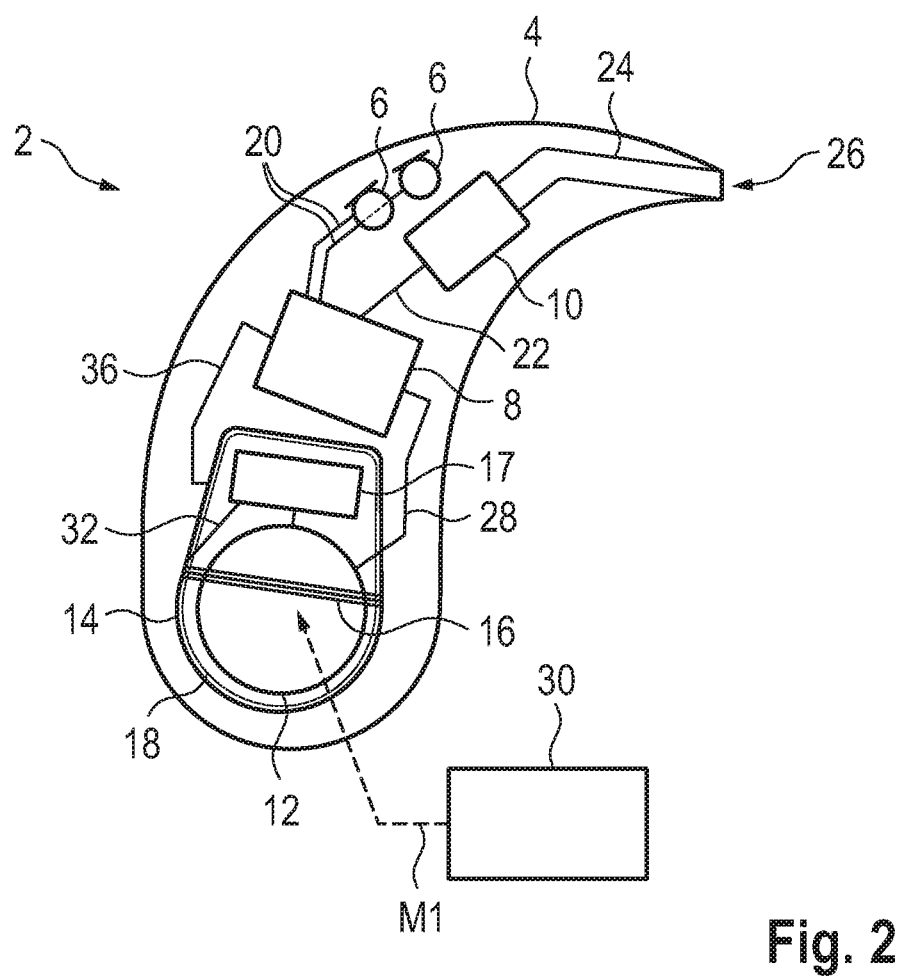
FIG. 2 is a schematic representation according to FIG. 1 of the hearing instrument there, as well as an external charging device which wirelessly charges the battery of the hearing instrument by way of inductive coupling with the charging coil.

The charging coil 16 is used for recharging the battery 12 with electrical energy and can be inductively coupled with a charging device 30 (schematically indicated in FIG. 2) for this purpose. The charging coil 16 is designed to receive an alternating magnetic field M1 from the charging device 30 for this purpose. A charging current induced in the charging coil 16 by this alternating field M1 is delivered to the charging electronics system 17 via a connecting cable 32 (FIG. 1), which charging electronics system controls the charging of the battery 12.

Figure 3:
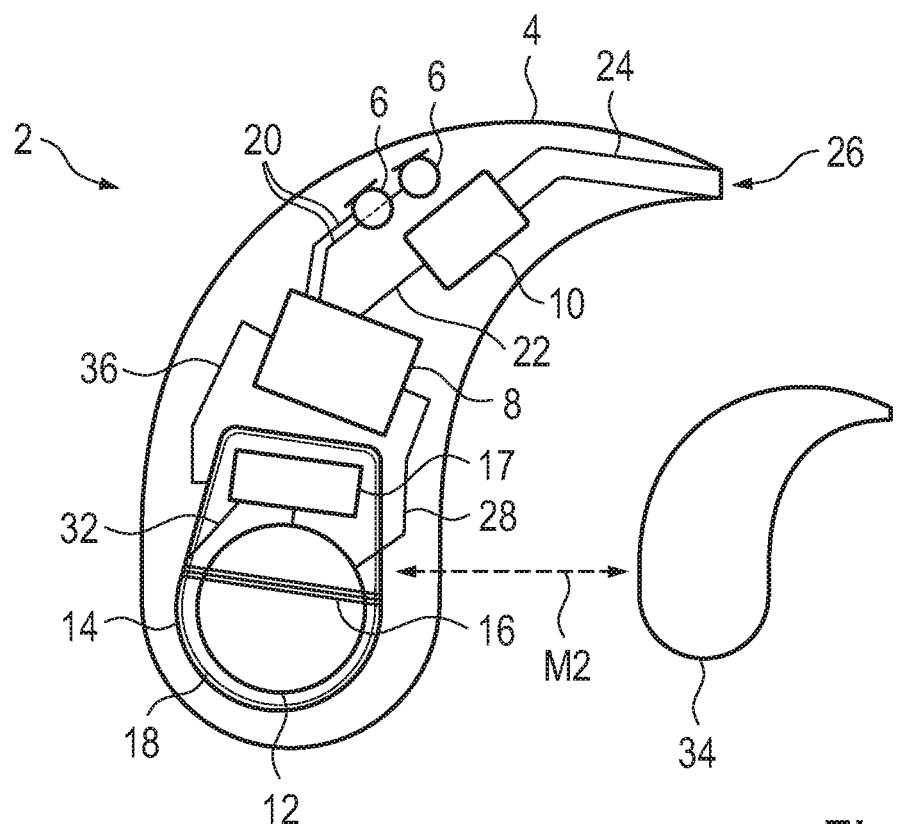
FIG. 3 is a schematic representation according to FIG. 1 of the hearing instrument there as well as a further hearing instrument, which wirelessly transmits data to the MI antenna by way of the inductive coupling and receives data therefrom.

The MI antenna 14 is designed, for example, as an inductive transceiver—as indicated in FIG. 3—for data exchange with a second hearing instrument 34, wherein this second hearing instrument 34 is worn on the other ear of the wearer (the second hearing instrument 34 is preferably designed identically to the hearing instrument 2 and is only represented in FIG. 3 as smaller than the latter for the sake of clarity). In this case, the MI antenna 14 is designed for transmitting and receiving alternating magnetic signals M2 in the megahertz range (for example with a frequency of 3.3 MHz). Inside the housing 4, the MI antenna 14 is connected to a (not explicitly represented) transmission and receiving unit of the signal processing unit 8 via a signal line 36.

Figure 4:
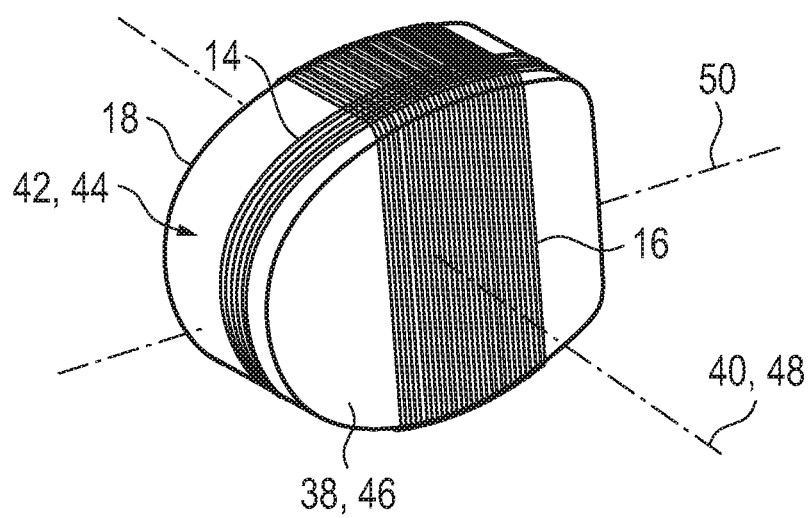
FIG. 4 is a schematic perspective representation of the magnetic core which is wound with the charging coil and the MI antenna.

As can be identified from FIGS. 1 and 4, the magnetic core 18 is designed as a cylindrical hollow body made from soft magnetic ferrite. Accordingly, it comprises two parallel end faces 38 which are opposite one another along an axis 40, as well as a circumferential wall 42 which connects the end faces 38. In the exemplary embodiment shown, for reasons related to installation space, the end faces 38 have an irregular shape of an oval flattened on one side.

The magnetic core 18 is in particular made up of two parts, namely of a pod 44 (formed by one of the end faces 38 and the circumferential wall 42) and a lid 46 (formed by the second end face 38). Alternatively, the magnetic core 18, as described in European patent EP 2 899 830 B1, is formed by a ferrite ring which is sealed on both sides by attached lids. In both cases, the magnetic core 18 is closed on all sides. In this case, at least parts of the current line 28 and the connecting cable 32 are connected to the battery 12 or the charging electronics system 17 before the lid 46 is placed onto the pod 44. In this case, the current line 28 and the connecting cable 32 are guided out of the magnetic core 18 in particular between the pod 44 and the lid 46.

The MI antenna 14 and the charging coil 16 are wound onto the magnetic core 18 in such a way that their respective coil axes 48 and 50 are orthogonal to one another (i.e. forming an angle of 90°). In this case, the MI antenna 14 is wound around the circumferential wall 42 of the magnetic core 18, whereby its coil axis 48 is oriented parallel to the axis 40 of the magnetic core 18 and coincides in particular with the latter. In this case, the MI antenna 14 is preferably wound in the center of the circumferential wall 42. However, it can also be arranged—as shown in FIG. 4 by way of example—offset from the center of the circumferential wall 42. In contrast, the charging coil 16 is wound onto the magnetic core 18 over the circumferential wall 42 and the end faces 38, so that its coil axis 50 is oriented orthogonally to the axis 40 of the magnetic core 18.

In an exemplary dimensioning, the magnetic core 18 has a height (measured in the direction of its axis 40) of 4 millimeters and a width (measured in the direction of the coil axis 50 and thus transverse to the axis 40) of 10 millimeters. The ratio of height to width is thus 1:2.5 in this example.

The invention is particularly clear from the exemplary embodiment described previously but is nevertheless not limited to this. In fact, further embodiments of the invention can be derived from the claims and the preceding description.

LIST OF REFERENCE NUMBERS 2 hearing instrument
4 housing
6 input transducer
8 signal processing unit
10 output transducer
12 battery
14 MI antenna
16 charging coil
17 charging electronics system
18 magnetic core
20 signal line
22 signal line
24 sound channel
26 tip
28 current line
30 charging device
32 connecting cable
34 hearing instrument
36 signal line
38 end face
40 axis
42 circumferential wall
44 pod
46 lid
48 coil axis
50 coil axis
M1 alternating (magnetic) field
M2 alternating (magnetic) signal

The invention claimed is:

1. A hearing instrument, comprising:
  a rechargeable battery;
  a charging coil for inductively receiving energy for charging said rechargeable battery;
  a transmitter and/or receiver coil electrically separated from said charging coil for inductively transmitting and/or receiving data;
  a magnetic core on which both said charging coil and said transmitter and/or receiver coil are wound; and
  said charging coil and said transmitter and/or receiver coil being wound on said magnetic core in such a way that their coil axes are oriented precisely or approximately orthogonally to one another for substantially precluding a mutual magnetic influence of said coils.

2. The hearing instrument according to claim 1, wherein:
  said magnetic core is configured as a hollow body; and said battery is disposed in said magnetic core.

3. The hearing instrument according to claim 1, wherein said magnetic core has a cylindrical form with two parallel end faces, which are opposite one another along an axis, and a circumferential wall which connects said end faces.

4. The hearing instrument according to claim 3, wherein said magnetic core has a height which is measured along the axis and a width which is measured perpendicular to the axis, and wherein a ratio of the height to the width is between 1:1 and 1:4.

5. The hearing instrument according to claim 3, wherein one of said transmitter and/or receiver coil or said charging coil is wound around said circumferential wall, so that its coil axis is oriented parallel to the axis of said magnetic core, and wherein the other of said transmitter and/or receiver coil and said charging coil is wound over said end faces and said circumferential wall, so that its coil axis is oriented orthogonally to the axis of said magnetic core.

6. The hearing instrument according to claim 1, wherein said magnetic core consists of a soft magnetic ferrite material.

7. The hearing instrument according to claim 1,
wherein said magnetic core is configured as a hollow body; and
further comprising an electronic component, said battery and/or said electronic component are disposed in said magnetic core.

8. The hearing instrument according to claim 7, wherein said electronic component is a charging electronic system.

9. The hearing instrument according to claim 3, wherein said magnetic core has a height which is measured along its axis and a width which is measured perpendicular to its axis, and wherein a ratio of the height to the width is 1:2.5.

10. The hearing instrument according to claim 1, wherein said magnetic core is configured as a flat cylinder with said transmitter or receiver coil being wound around a circumferential wall of said magnetic core and said charging coil is wound over end faces and said circumferential wall of said magnetic core.

* * * * *